Dec. 16, 1924.
C. S. BANKS
METHOD OF GENERATING HYDROCYANIC ACID GAS
Filed March 29, 1921 2 Sheets-Sheet 2
1,519,434
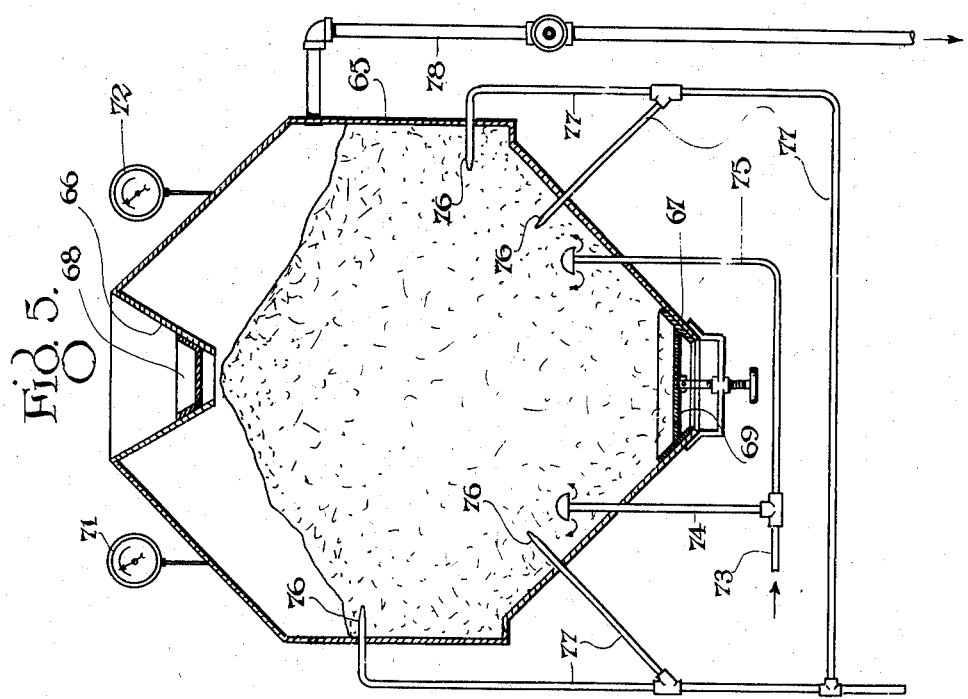
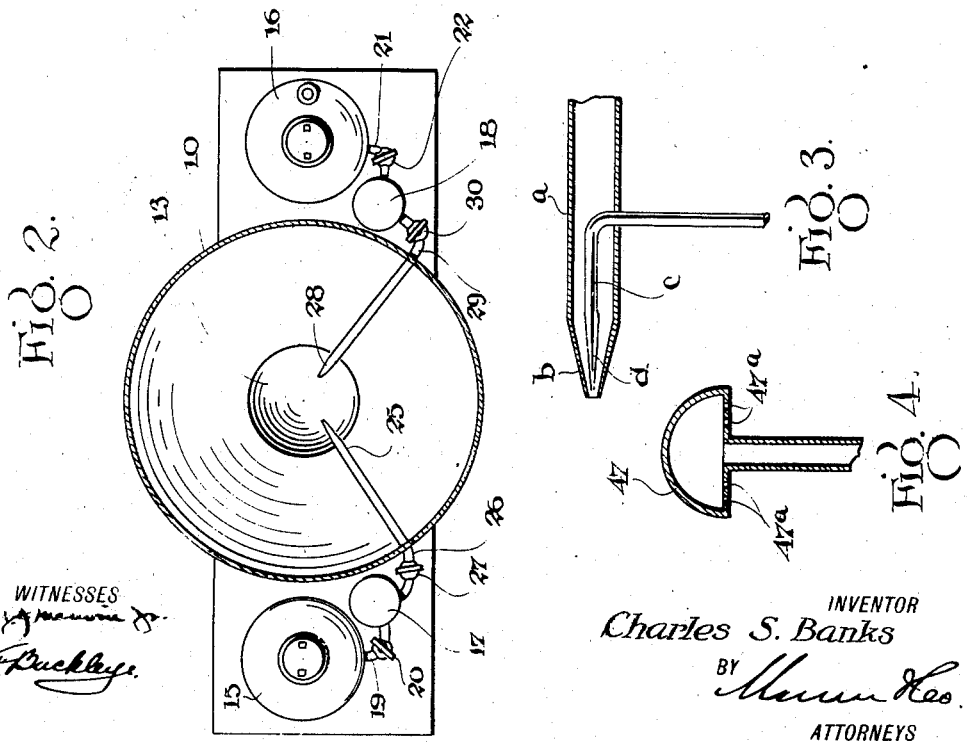
INVENTOR
Charles S. Banks Patented Dec. 16, 1924.

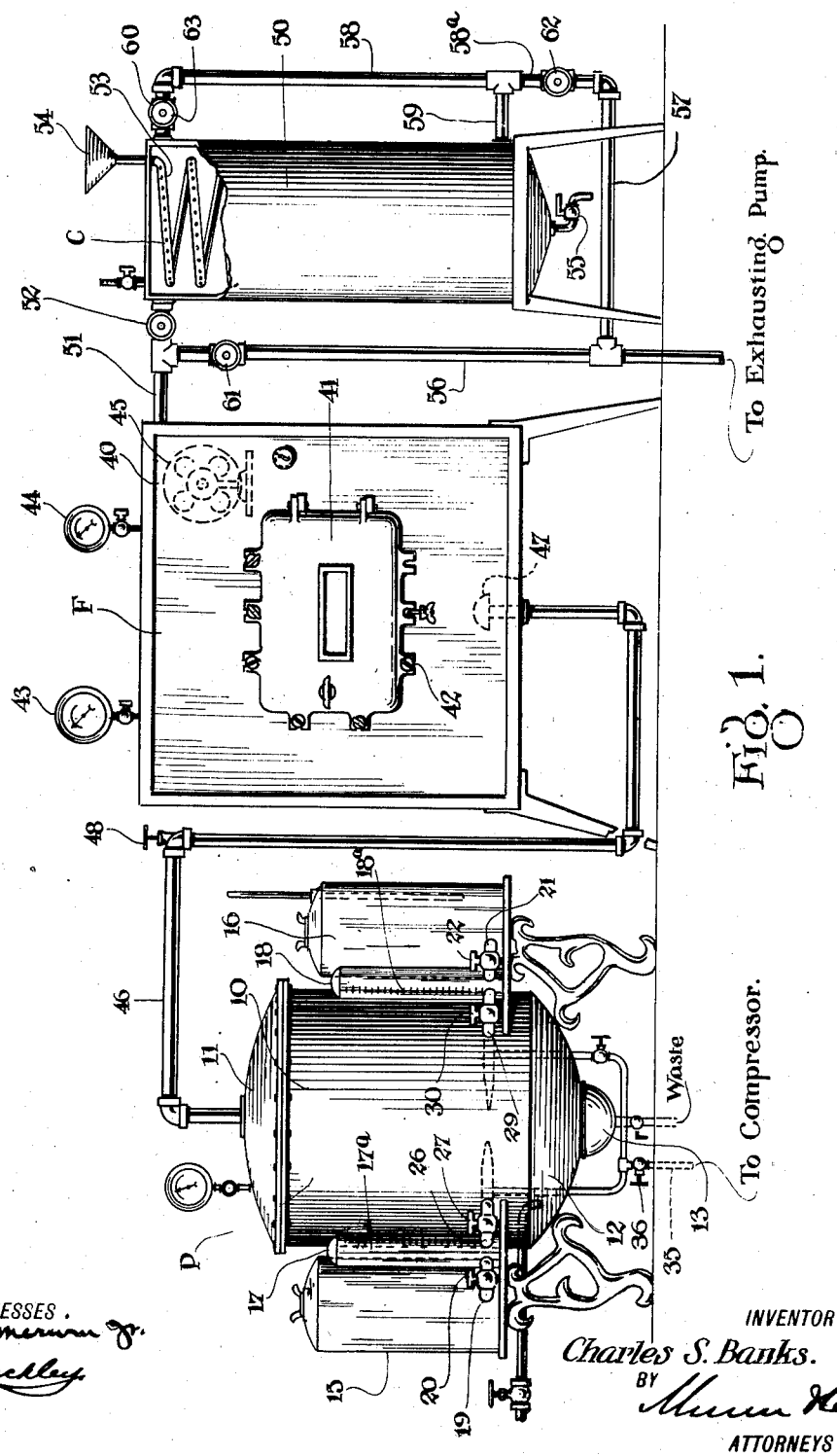

UNITED STATES PATENT OFFICE.

CHARLES SUMNER BANKS, OF MANILA, PHILIPPINE ISLANDS.

METHOD OF GENERATING HYDROCYANIC-ACID GAS.

Application filed March 29, 1921. Serial No. 456,590.

*To all whom it may concern:*

Be it known that I, CHARLES SUMNER BANKS, a citizen of the United States, and a resident of Manila, Philippine Islands, have invented certain new and useful improvements in Methods of Generating Hydrocyanic-Acid Gas, of which the following is a specification.

The present invention relates to a method of generating and handling hydrocyanic acid gas, and more particularly to a method of this character especially adapted for fumigating purposes or for effecting the destruction of insects, parasitic or other undesirable animal life.

The object of the invention is to provide a method of this character which brings about the efficient generation or production of a chemically pure hydrocyanic acid gas in a manner to avoid to a large extent the corrosive effects of the substances utilized in the production of the gas before and during the reaction, which diffuses or distributes the gas throughout the entire region or chamber in which fumigation is being carried out, which withdraws the gas from the fumigating chamber and converts it into innocuous substance easily handled and not dangerous to life and health, and which in all phases of its operation is highly efficient, entirely safe, and responsive to the control of the operator.

Other objects and advantages of the invention reside in the certain novel features to be hereinafter more fully described and particularly pointed out in the appended claims, reference being had to the accompanying drawings forming part of this specification, and in which:

Figure 1 is an elevational view illustrating the apparatus embodying the invention, parts being shown in section for the sake of illustration;

Figure 2 is a plan view of the generator, the generating chamber being shown in section for the sake of illustration;

Figure 3 is a detail view, illustrating the construction of the spray nozzles;

Figure 4 is a detail view, illustrating the means for dispersing the gas in the fumigating chamber; and Figure 5 is a view in vertical section of a modified form of fumigating chamber.

Referring to the drawings wherein is shown the preferred form of apparatus embodying the invention, the reference character P designates generally the producer or generator which is associated with a fumigating chamber F and supplies the same with hydrocyanic acid gas. A converter or recovery apparatus C is arranged in cooperative relation with the fumigating chamber and serves to convert the hydrocyanic acid gas into innocuous substance easy to handle and adapted for re-use in the generation of the gas. Preferably, the generator, fumigating chamber and converter are connected in series.

The generator comprises a generating chamber consisting of a cylindrical body portion 10 closed at its upper end by a dome-shaped head 11, suitably secured to the cylindrical body portion, and at its lower end by a similarly shaped head 12, the lower end of which is provided with a basin or the like 13, in which the residuum is collected.

A tank or reservoir 15 is suitably supported adjacent to the generating chamber and contains a supply of cyanide solution such as potassium cyanide, sodium cyanide or the like. A tank 16 is also suitably supported adjacent the generator chamber and preferably is arranged opposite the tank 15. The tank 16 contains a supply of acid such as sulphuric acid, hydrochloric acid or the like. Adjacent the tanks 15 and 16 measuring cylinders 17 and 18 respectively are arranged. These measuring cylinders are preferably constructed of glass or other transparent material and have provided thereon graduations or like indicia designated at 17ª and 18ª, respectively. A short pipe connection 19 leads from the tank 15 to the measuring cylinder 17 and has a shut-off cock 20 incorporated therein for controlling the flow of cyanide solution from the tank 15 into the cylinder 17. A similar pipe connection 21 leads from the tank 16 to the measuring cylinder 18 and has a shut-off cock 22 incorporated therein for controlling flow of acid from the tank 17 to the measuring cylinder 18.

A spray nozzle 25 for the cyanide solution is connected with the lower end of the measuring cylinder 17 by means of a pipe 26 and in this pipe exteriorly of the generating chamber a valve 27 is incorporated to control the flow of the cyanide solution from the measuring cylinder to the spray nozzle. A spray nozzle 28 for the acid is connected with the measuring cylinder 18 by a pipe 29 in which is included exteriorly of the generating chamber a valve 30, which controls the flow of acid from the measuring cylinder to the spray nozzle 28. The spray nozzles for the cyanide and for the acid are arranged within the generating chamber and spaced from the walls thereof. The spray nozzles are arranged so that their axes of discharge intersect at a short distance from the orifices of the nozzles and centrally of the chamber whereby the sprays from the nozzles intermingle in space.

Means is provided for supplying each of the spray nozzles with compressed air or similar fluid under pressure to entrain and spray the cyanide solution and acid, respectively. This means includes any suitable source of compressed air from which a pipe 35 extends and communicates with branches 37 and 38 which lead to the spray nozzles 25 and 28, respectively. A valve 36 is incorporated in the pipe 35.

The spray nozzles are identical in construction and as shown in detail in Figure 3 each comprises an outer jet or tubular body portion $a$ through which the liquid cyanide or acid flows and which has its discharge end constricted as at $b$. Within the tubular body portion the branch of the compressed air pipe extends and has connected thereto or integrally formed therewith the air discharge jet $c$ which extends axially of the tubular body portion and has its discharge orifices constricted, as at $d$ and terminating within the constricted portion $b$ of the tubular body portion $a$. The jet of air or compressed fluid thus extrains the surrounding acid or cyanide and projects it from the discharge orifice of the spray nozzle in the form of a spray that is in an atomized or highly comminuted state.

The fumigating chamber consists of a gas-tight compartment 40 having a door 41 therein adapted to effect a gas-tight closure by any suitable means including fastening means 42. Pressure and vacuum gauges 43 and 44 are provided on the fumigating chamber. Within the chamber suitable means is provided for agitating or circulating the gas therein and preferably consists of an electric fan or the like 45. The fumigating chamber is supplied with hydrocyanic acid gas by means of a pipe connection 46 which leads from the discharge outlet in the head 11 of the generator to the bottom of the fumigating chamber. A spreader plate or baffle 47 (see Figure 4) is arranged over the inlet end of the pipe 46 and supported thereon by a spider 47ª. A valve 48 is provided in the pipe 46. The articles, objects or substances to be fumigated are within the fumigating chamber and are therein subjected first to a vacuum and then to the action of the hydrocyanic acid gas.

The converter or recovery apparatus comprises a drum 50 into which the hydrocyanic acid gas may be led from the fumigating chamber by means of a pipe connection 51. A valve 52 included in the connection 51 controls the passage of the gas through the pipe 51. Within the drum, a perforated coil pipe 53 is arranged and is adapted to discharge a shower of finely divided hydroxide such as potassium or sodium hydroxide solution which is fed into the pipe exterior of the drum by a funnel 54 or pipe from storage tank or the like. The lower end of the drum is of conical form and is provided with a valved discharge pipe 55.

A suction pipe 56, which leads from any conventional suction or exhaust pump (not shown) is connected at one end to the pipe 51 leading to the fumigating chamber and is connected intermediate its ends by means of branches 57 and 58 and short pipes 59 and 60 with the upper and lower ends of the drum 50. In the pipe 56 and lower section 58ª of branch 58 and in the short pipe 60 valves indicated at 61, 62, 63, respectively are incorporated. By manipulating these valves a vacuum or partial vacuum may be created in the fumigating chamber to enhance the penetrating effect of the hydrocyanic acid gas. The suction may act directly through the pipes 56 and 51 but preferably it always acts indirectly through the drum 50 either by way of pipe 57, lower section 58ª of pipe 58 and short pipe 59, or by way of pipes 57, 58 and 60.

In practice, the objects, articles or substances to be fumigated are placed in the fumigating chamber and the chamber is sealed by securely closing the door 41 and a partial vacuum is created. Measured quantities of the cyanide solution and the acid are then introduced into the cylinders 17 and 18, respectively, the cocks 27 and 30 being closed and the cocks 20 and 22 being opened to effect this phase of the operation. When the desired quantity is contained in the cylinders 17 and 18, the cocks 20 and 22 are closed and the cocks 27 and 30 are opened and at the same time the valve 36 is open and the compressed air is permitted to discharge in jets from the constricted orifice of the jets $c$ of the spray nozzles. These jets of compressed air entrain the cyanide solution and the acid and atomize or spray the same. By virtue of the disposition of the spray nozzles the sprays come into contact or intermingle while the cyanide and acid are in a highly comminuted state and suspended in space within the generating chamber and out of contact with the walls thereof. This condition or state of these substances brings out a thorough and efficient reaction which is completed while the substances are suspended. The corrosive action of the cyanide and the acid is thus greatly lessened as they are almost immediately converted into hydrocyanic acid gas and a salt, such for instance as potassium sulphate when potassium cyanide and sulphuric acid are used in the generation. The hydrocyanic acid gas generated flows through the pipe 46 when the valve is open and into the fumigating chamber. In the fumigating chamber it is uniformly distributed or dispersed by means of the baffle or deflector arranged over its inlet and by the action of the fan 45, and of the vacuum or partial vacuum. After the fumigation has been completed the valve 52 is opened and the valve 62 is opened. The hydrocyanic acid gas then flows into the top of the drum 50 and downwardly therethrough while being treated to a shower of finely divided potassium or sodium hydroxide or the like. This converts the hydrocyanic acid gas into a cyanide salt, such as potassium cyanide, and water. The potassium cyanide may be easily handled, is innocuous, and is readily withdrawn from the drum through the discharge valve 55.

It will be understood that the invention involves a method of generating or producing hydrocyanic acid gas and of utilizing this gas for fumigation. This method consists in creating a spray of cyanide solution such as potassium cyanide solution, and a spray of acid—such as sulphuric acid—and causing said sprays to intermingle while suspended and in a highly comminuted state. In the next step the hydrocyanic acid gas thus generated is introduced into the fumigating chamber. After it has completed the fumigation it is transferred to the recovery or converting chamber where it is treated with a shower of finely divided potassium hydroxide solution to reduce it to potassium cyanide and water. The potassium cyanide thus recovered may be again utilized in the production of the hydrocyanic acid gas and at the same time it is present in innocuous form susceptible of handling and transportation.

In Figure 5 there is shown a modified form of fumigating chamber especially adapted for use in the fumigation of grain or similar substances. This chamber comprises a hopper-like structure 65 having upper and lower openings designated at 66 and 67 provided with gas-tight closures 68 and 69, respectively. Pressure and vacuum gauges 71 and 72 are provided on the hopper. The hydrocyanic acid gas is led through a pipe 73 to the branches 74 and 75 which discharge into the opposite sides of the hopper. The means for agitating the gas and uniformly distributing it in the fumigating chamber comprises a plurality of jets 76 which are supplied with compressed air by pipes 77 and which induce a circulation of the gas through the grain. As shown in the drawing certain of the jets are inclined to induce a whirling or vortical circulation. The gas may be withdrawn and its dispersion may be enhanced by means of a conventional suction pump operating upon the chamber through the suction pipes 78.

I claim:

1. The method of producing hydrocyanic acid gas which consists in creating a spray of alkali metal cyanide solution and a spray of sulphuric acid and causing said sprays to intermingle.

2. The method of producing hydrocyanic acid gas which consists in creating a spray of cyanide solution and a spray of acid capable of liberating hydrocyanic acid from its salts and causing said sprays to intermingle.

CHARLES SUMNER BANKS.